(12) United States Patent
Bartlok

(10) Patent No.: US 6,527,258 B2
(45) Date of Patent: *Mar. 4, 2003

(54) APPARATUS FOR THE COLLECTION AND DISTRIBUTION OF LIQUID IN A COLUMN

(75) Inventor: Guido Bartlok, Dresden (DE)

(73) Assignee: Sulzer Chemtech AG, Winterthur (CH)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/493,513

(22) Filed: Jan. 28, 2000

(65) Prior Publication Data

US 2002/0079597 A1 Jun. 27, 2002

(30) Foreign Application Priority Data

Mar. 19, 1999 (EP) .............................. 99810247

(51) Int. Cl.⁷ ................................................ B01F 3/04
(52) U.S. Cl. ........................................ 261/97; 261/110
(58) Field of Search ................... 261/97, 110, DIG. 44, 261/DIG. 85

(56) References Cited

U.S. PATENT DOCUMENTS

| | | | | |
|---|---|---|---|---|
| 4,416,835 A | * | 11/1983 | Bosne | 261/DIG. 85 |
| 4,816,191 A | * | 3/1989 | Berven et al. | 261/97 |
| 5,051,214 A | * | 9/1991 | Chen et al. | 261/DIG. 44 |
| 5,061,407 A | * | 10/1991 | Nutter | 261/97 |
| 5,464,573 A | | 11/1995 | Tokerud | |
| 5,776,316 A | * | 7/1998 | Potthoff et al. | 261/97 |

FOREIGN PATENT DOCUMENTS

| | | | | |
|---|---|---|---|---|
| DE | 4018137 A1 | 12/1991 | | |
| DE | 4314551 A1 | 11/1994 | | |
| DE | 19615645 A1 | 10/1997 | | |
| EP | 0374443 A2 | 6/1990 | | |
| EP | 0517670 A1 | * 12/1992 | | 261/97 |

* cited by examiner

Primary Examiner—C. Scott Bushey
(74) Attorney, Agent, or Firm—Townsend and Townsend and Crew LLP (57) ABSTRACT

The apparatus for the collection and distribution of liquid in a column having at least one lamella collector and a distributor outflow system which is arranged below it. A side passage is contained in the or in each lamella collector and liquid outflow openings are arranged in a combination, as a result of which a hydrodynamic equalization for a liquid to be distributed results.

16 Claims, 6 Drawing Sheets

APPARATUS FOR THE COLLECTION AND DISTRIBUTION OF LIQUID IN A COLUMN

BACKGROUND OF THE INVENTION

1. Field of the Invention

The present invention relates to an apparatus for the collection and distribution of liquid in a column. In this a plurality of unordered or ordered packings are located in the column in each case on a carrier grid, beneath which the apparatus for the collection and distribution of liquid is arranged.

2. Description of the Prior Art

In material exchange columns of this kind the packing or the filling body is supported by a carrier grid, with the liquid dripping off over this carrier grid and being caught, mixed and conducted to the new distribution or redistribution respectively or to the liquid removal.

Field of application is preferably the material separation technique such as the absorption and desorption in fluid systems, the distillation and rectification and the technical carrying out of reactions at catalyst layers. For several years it has been usual to use non ordered filler bodies or packings, in particular structured or ordered packings respectively, in material exchange columns. Their effectiveness depends very strongly on the uniform wetting of their surface with back-flowing liquid and on the observing of a liquid-vapour mass ratio which is the same over the cross-section. In the event of non-uniform liquid output and distribution and the resultant non-uniform wetting, maldistribution (faulty distribution) arises inside the filler body layers for example in the form of passage flow. This quite considerably restricts the effectiveness and the function of the exchange column.

For this reason a liquid distributor is arranged above a packing section which is intended to distribute the downwardly flowing fluid as homogeneously as possible over the column cross-section.

A large number of collector and distributor apparatuses for liquids are known which attempt with more or less cost and complexity to achieve the required uniform liquid distribution in the described material exchange columns. Distributors of this kind are for example known from an article by P. Bomio et al., Chem. Tech., vol. 43, no. 11/12, 1991 and are designated there as tube distributors, element distributors or passage distributors. These types of liquid distributors have horizontally oriented distributor passages which are fed by at least one main passage, which as a rule extends perpendicularly to the distributor passages. In a tube distributor the distributor passages are closed at the upper side; in an element distributor or passage distributor they are open above. Element distributors or passage distributors operate with a certain filling level in the passages. The hydrostatic pressure which is connected therewith regulates the liquid amount which drips through special flow-off elements onto the packing section lying below them. The filling height increases approximately as the square of the liquid load. Since the passages cover over a large portion of the column cross-section, a distributor of this kind contains large amounts of liquid of a specific composition. This affects the inertia of the distributor and thereby of the entire column with respect to rapid changes of the composition of the distributed liquid.

The description of the functioning principles of these known collector and distributor apparatuses also illustrates their disadvantages to the same extent.

The liquid flowing out of this packing section is caught and brought together by a liquid collector. The liquid is conducted out of the liquid collector into the main passage or the side passages of the distributor via a tube or shaft construction. The feeding in takes place via a relatively large, generally central inflow or a plurality of relatively large inflows. The turbulences and flow velocities resulting from this method of construction are very large in distributor inflows of this kind. For this, suitable means, such as a pre-distributor passage or an inflow calmer, must be installed in the main passage. The transfer of the liquid takes place in one stage or in a plurality of stages in a closed or open design, however always in the form that the liquid flows following gravity. In this the problem arises that a non uniform distribution of the liquid is produced by the flow in the longitudinal direction of the distributor passages. Depending on how far the liquid inflow and the liquid outflow are separated from one another in a passage, the outflow opening is flowed through by liquid with different outflow speed.

It was also recognised that the weak points of the material exchange column with respect to rapid load changes lie at the liquid collectors and liquid distributors. Particularly important are those distributors and collectors which are arranged between packing sections and which are intended to provide for as uniform a distribution of the back-flowing liquid as possible over the column cross-section. It takes for example a long time until a new stationary state, in conjunction with a higher or lower filling level in the distributors, is achieved. The cause is to be seen in that the concentration of large liquid volumes must be changed before the new stationary state sets in.

Furthermore, it must be remarked that the previous apparatuses for the bringing together and complete mixing of the entire back-flowing liquid after their being caught in the collector and the subsequent multiple new distribution or redistribution up to and including the fine distribution at the drip points are constructionally very complicated and expensive.

The frequently used multiple stage coarse distribution of the entire back-flowing liquid through inflows, main passages and side passages contains many sources for a maldistribution of the liquid. Sources of error are for example the non uniform flow conduction through continual accelerations and decelerations of the liquid and the insufficient levelling during the assembly.

In the known apparatuses, large geodetic height differences are required to sufficiently accelerate and decelerate large liquid volumes a plurality of times. Through this the constructional height of the know apparatus is relatively large.

In addition the apparatuses for the coarse distribution cause a strong non uniformity for the gas or vapour flow respectively, which has an influence on the efficiency of the entire column.

From the prior art it is further known that one can dispense with installations for the intentional mixing of the downwardly dripping and captured liquid in order to reduce the constructional height of the material exchange columns. An apparatus for the collection and redistributing of liquid in accordance with the preamble of the invention was described in U.S. Pat. No. 5,464,573. The apparatus disclosed therein dispenses with installations for the intentional mixing of the captured liquid with the decisive disadvantage that in the event of a non uniform distribution of the liquid a liquid equalization and the flows connected therewith come about in the horizontal plane. The already described effects of turbulences in the liquid distribution in the conventional distributor apparatuses are even increased through the simple saving in collection and pre-distributor stages and the result is non uniform liquid outflow out of the distributor.

SUMMARY OF THE INVENTION

The object of the present invention is now to develop an apparatus for the collection and distribution of gas and liquid in material exchange columns which enables a very homogeneous liquid output over the column cross-section with a low constructional height and which in addition enables a rapid adaptation to load changes during operation.

An apparatus in accordance with the present invention is designed in such a manner that the liquid collector, the gas or vapour distributor respectively and the liquid distributor are combined with one another in one apparatus.

The back-flowing liquid which is caught by a collector which is modified in accordance with the present invention is not intentionally brought together and intensively mixed for the purpose of an equalization of the composition, but rather it was surprisingly found that the object of the present invention is satisfied in that the liquid is distributed directly in the collector to such a uniform extent that a hydrodynamic equalization is realized with a small geodetic height difference.

A hydrodynamic equalization is present when at spatially separated similar liquid outlet openings the direction, velocity and surface level of the liquid flow lying above them are equal.

The intensity of the equalization flows and the amount of the liquid which participates in the hydrodynamic equalization is influenced by the hydrodynamic maldistribution at the end of the packing section which is located above the collector and distributor apparatus. The collector and distributor apparatus has flow splitters which conduct the horizontal equalization flows in such a manner that they can exert no disturbing influence on the new distribution of the back-flowing liquid. The apparatus is designed in such a manner that the liquid preferably flows directly from the collection location to the nearest lying drip point with a low flow velocity.

To be named as essential advantages of the invention are that a very homogeneous fluid dynamical liquid output with high distribution quality is achieved through the reduction of unnecessary flow turbulences and a high drip location density is realized with a small constructional height. The equalization flows required are far less than the flows in previous collector and distributor constructions.

Furthermore, the stationary liquid content (hold up) is reduced in comparison with a conventional collector and distributor apparatus through a lower number of distributor stages and the horizontal liquid transport is strongly reduced. Smaller passage widths can thus be realized for the distributor passages.

An improvement of the load change behaviour is caused by the shorter dwell time of the liquid in the collector and distributor apparatus and through the reduction of the stationary fluid content.

Advantageous is also the reduction of the total weight of the apparatus and the reduction of the cost and complexity of the assembly in comparison with conventional collector and distributor apparatuses.

Instead of the reduction of the constructional height of the column, the separator stage number can subsequently be increased in existing columns when the possibility of the installation of additional packings after the replacement of the conventional collector and distributor apparatus with a novel one in accordance with the invention is used.

DETAILED DESCRIPTION OF SPECIFIC EXEMPLARY EMBODIMENTS

Figure 1:
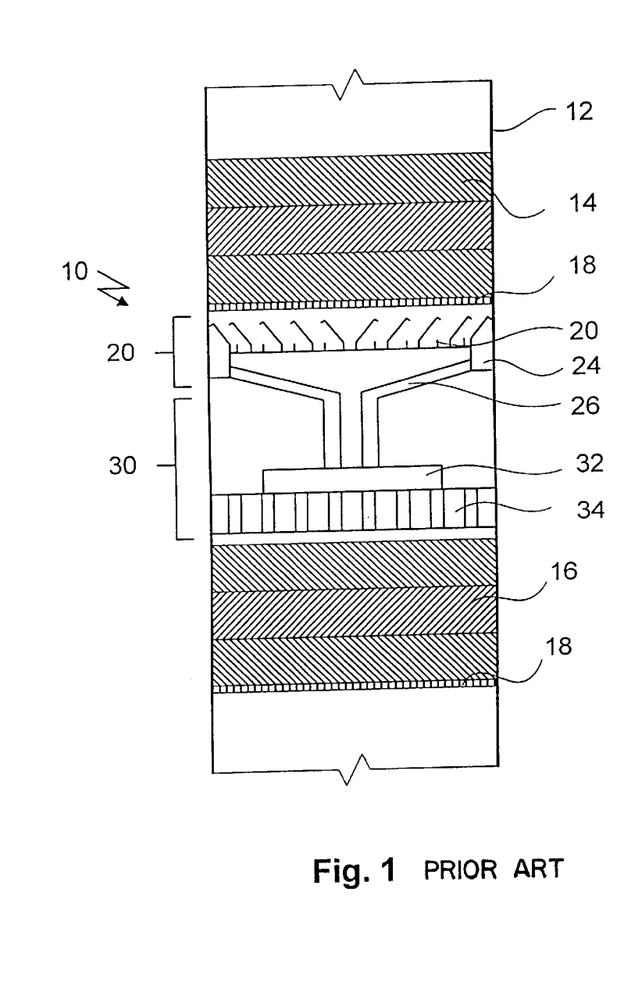
FIG. 1 is the schematic illustration of the previous method of construction, packing column with separate collector and distributor apparatus.

In FIG. 1 the schematic illustration of a conventional redistributor station 10 is illustrated. In this the column chute 12, the upper packing bed 14, the lower packing bed 16 and the redistributor stations placed between them can be seen. The latter consists of a collector apparatus 20 and a completely separate distributor apparatus 30. The liquid is conducted from the collector apparatus 20 to the mainly central inlet of the pre-distributor 32 or distributor 34 through at least one elongate and downwardly directed down pipe 26. Then the liquid is to be uniformly distributed over the lower packing bed 16 with the help of at least one distributor stage.

Figure 2:
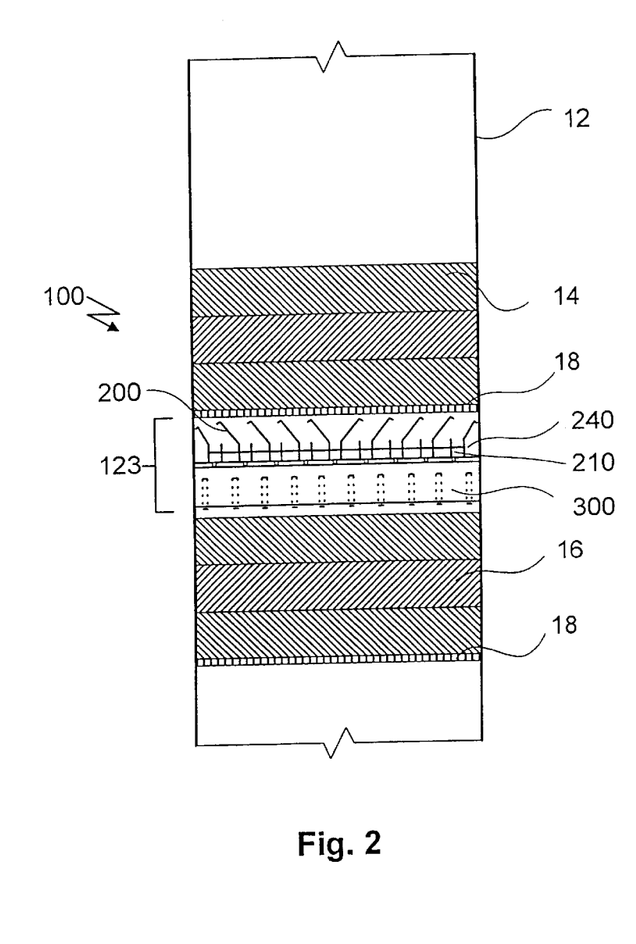
FIG. 2 is the schematic illustration of a packing column with a collector and distributor apparatus in accordance with the invention.

FIG. 2 is the schematic illustration of a redistributor station 100 with a compact collector and distributor apparatus 123 in accordance with the invention. The illustration comprises the column chute 12, as in FIG. 1, an upper and lower packing bed 14 and 16. The reduction of the space between the upper and lower packing bed in comparison with FIG. 1 is clearly recognisable.

Figure 3:
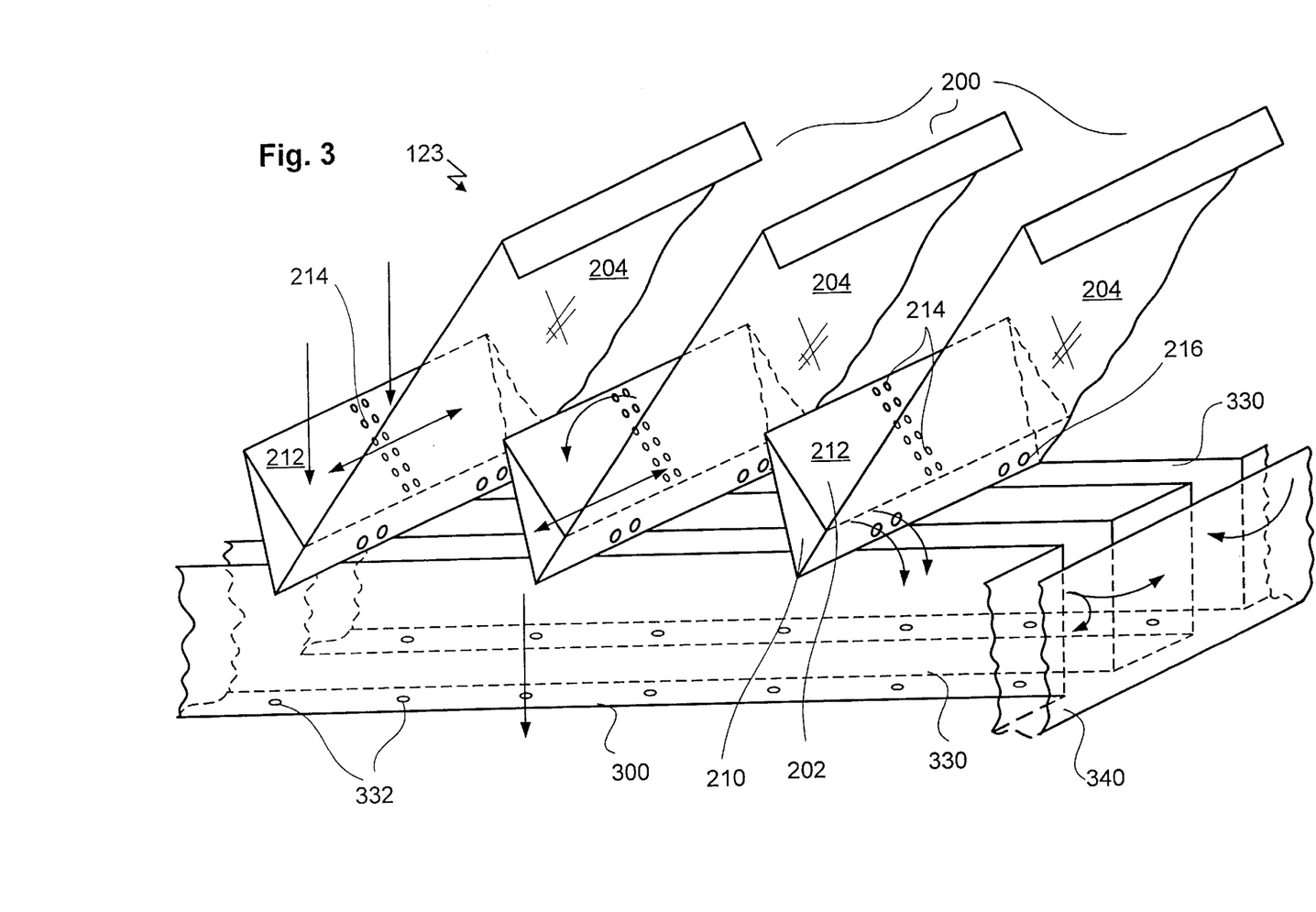
FIG. 3 is the perspective view from above onto a redistributor station in accordance with the invention, consisting of liquid collectors and distributors, partly broken away.

FIG. 3 shows sections of a compact collector-distributor apparatus 123, which is composed of a lamella collector 200 with integrated side passages 210 and a distributor outflow system 300 arranged below it, preferably with a ring passage 340.

The main passages 202 of the lamella collector 200 are arranged horizontally parallel to one another and vary in length so that they reach up to the column chute. The so-called lamella 204 of the lamella collector 200 are sheet metal lamina which are angularly bent off or secured in deviation from the vertical column axis at the upper edge of the main passages 202. Their projected area covers over the quasi free column cross-sectional area between the main passages 202 and thereby conducts the liquid which trickles from the upper packing bed 14 into the main passages 20 of the collector. The lamella 204 are bent a small amount downwards at an inclination at the upper end and conduct a portion of the collected liquid into the adjacent main passage. Each main passage 200 of the collector contains a flow splitter 212, for example in the form of a sheet metal lamina or section, with hydraulically definite openings and with an inclined or horizontal section. This flow splitter 212 is a constituent of the side passage 210 and separates the latter from the main passage. The inflow of the liquid from the main passage 202 to the side passage 210 takes place via hydraulically definite liquid outflow openings 214. The liquid departs from the side passages 210 via other hydraulically definite liquid outflow openings 216 and enters into the distributor outflow system 300.

When the liquid amounts which are conducted in out of the different side passage 210 differ, a hydrodynamic equalization also takes place in the distributor passages 330. A ring passage 340 can preferably be arranged in such a manner that all distributor passages 330 are connected to one another via it. The liquid flows and is then uniformly distributed in accordance with the principle of communicating tubes. The distributor passages 330 have a flow-off system which has hydraulically definite liquid outflow openings 332. The liquid is uniformly distributed onto the lower packing bed through these liquid outflow openings 332.

The lamella collector 200 is separated from the side passage 210 by a flow splitter 212. By flow splitter is meant here a construction which divides up a medium which flows in one direction into two partial flows with different direction, e.g. into a flow which continues to be horizontal and one with a vertical directional component. The flow splitter 212 is preferably arranged in such a manner that during the operation it is located beneath the surface of the liquid which is previously caught and is then standing or flowing in the corresponding main passage 202. It produces a flow resistance in the vertical direction. Through this two flow cross-sections arise. In the upper, the main passage 200, the liquid is transported horizontally and in the lower passage, the side passage 210, a flow in the direction of the liquid outflow openings 216 alone arises. The reduction of the horizontal flow velocity which is caused by the maldistribution directly above the liquid outflow openings 216 causes a significant improvement of the distribution quality.

Figure 4:
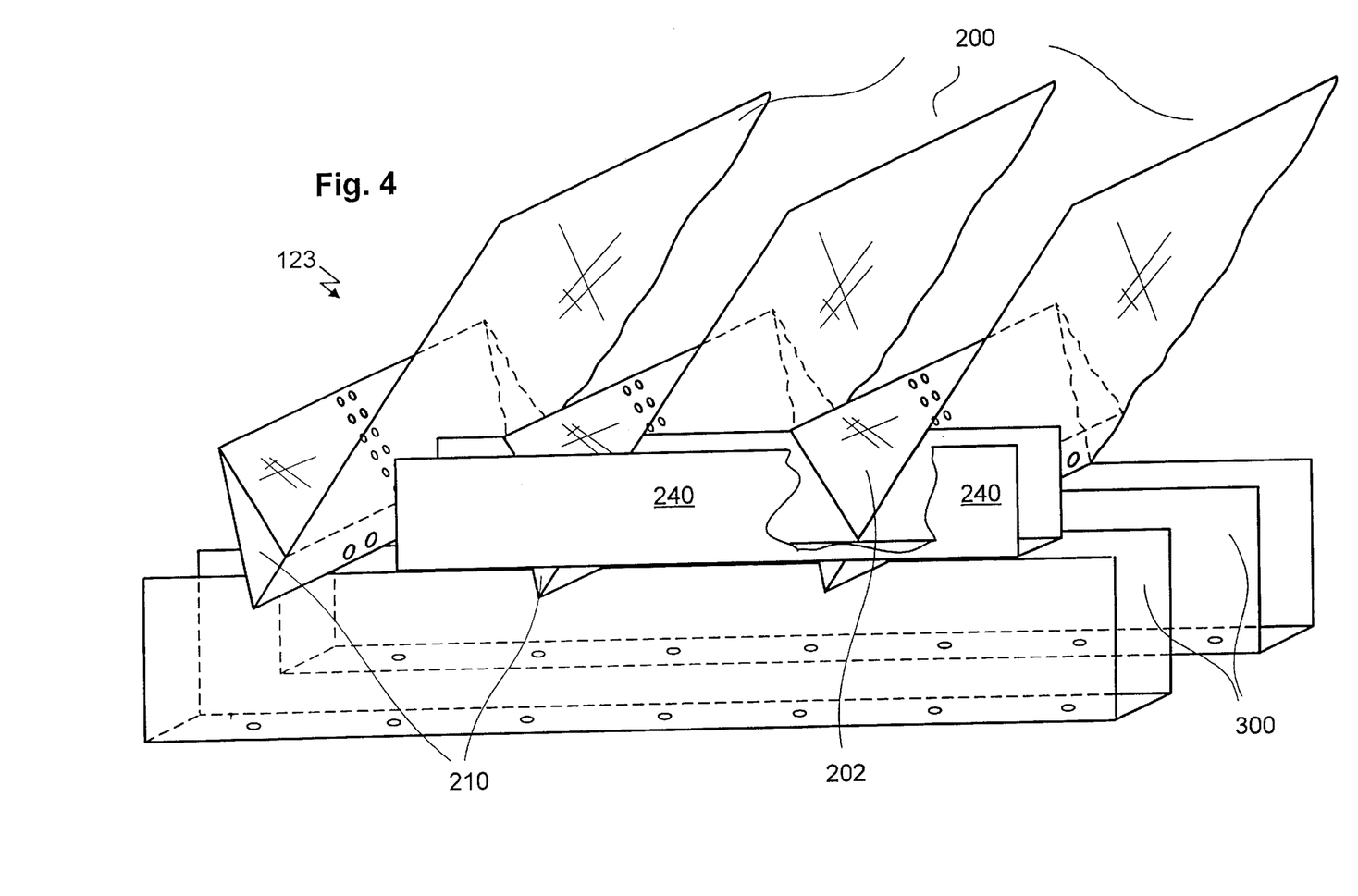
FIG. 4 is an exemplary embodiment for the further development in accordance with the invention of a collector-distributor apparatus in a graphic illustration, FIGS. 5 a/b/c are different examples of the execution of the main and side passages of the lamella collector.

FIG. 4 shows the section of a varied compact collector-distributor apparatus 123, which is assembled from a kind of lamella collector 200 with integrated side passages 210 and with a ring passage 240 as well as a distributor outflow system 300 which is arranged beneath it. The main passages 202 of the lamella collector 200 are arranged horizontally parallel to one another and vary in length so that they reach up to the ring passage 240 which is arranged at the inner side of the column chute. All main passages 202 of the collector are thereby connected to the ring passage 240 and are connected to one another by it in this manner. The ring passage 240 enables the equalization of the liquid amounts in all main passages 202 to one level.

Figure 5:
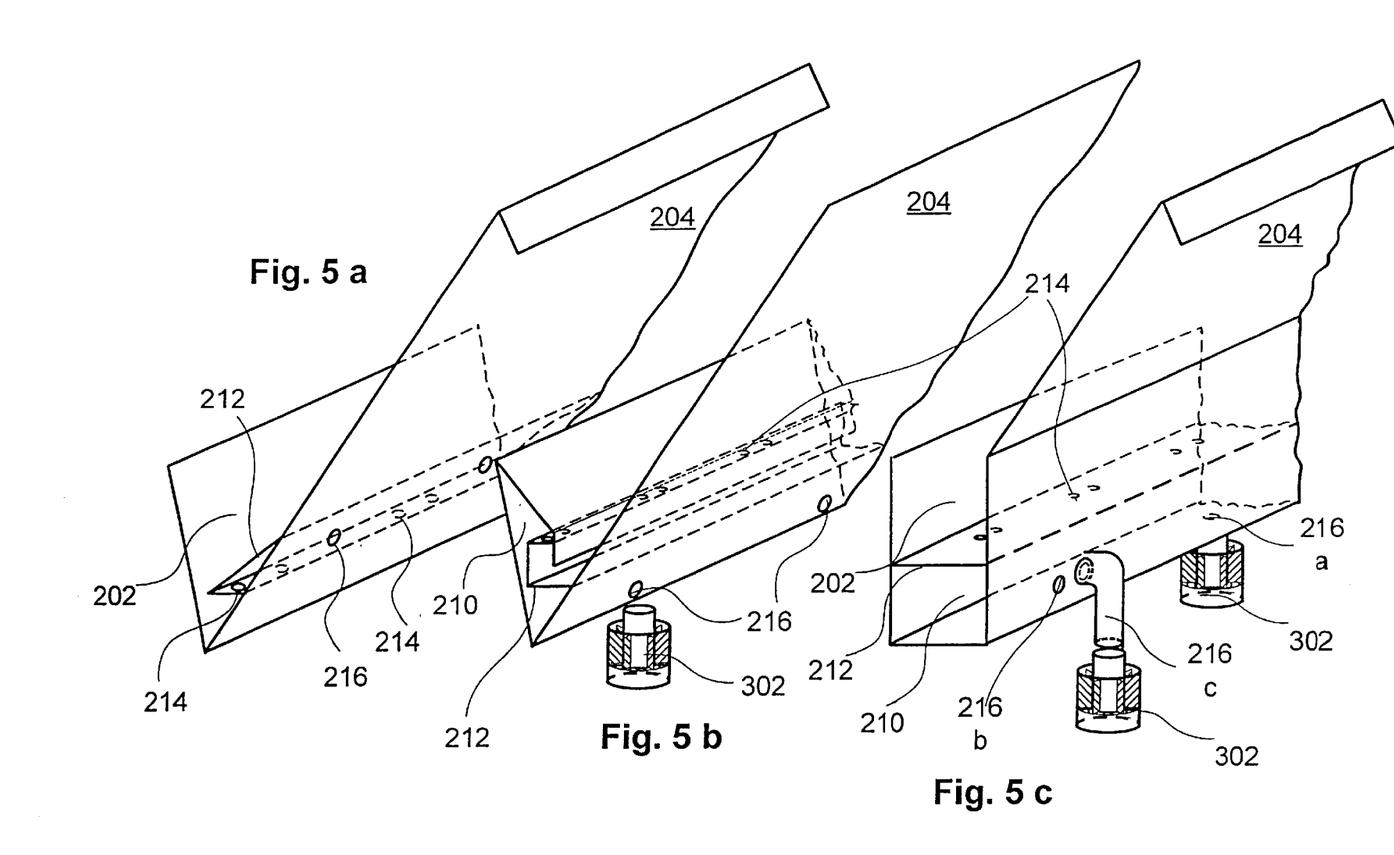

FIGS. 5 a/b/c shows enlarged embodiments of the main passage 202, of the flow splitter 212 and of the side passage 210. The liquid departs from the side passage 210 via other hydraulically definite liquid outflow openings 216. The liquid outflow openings 216 can be executed as conventional base holes 216a, as simple side holes 216b, or as side holes with drain-off tubes 216c (see FIG. 5c). They conduct the liquid into the open distributor outflow system which is arranged below it. The constructional elements between the liquid outflow openings 216 and the distributor outflow system are however advantageous but not necessary inflow calmers 302 (see also FIG. 6). They prevent strong undesirable flow turbulences arising through the inflow of the liquid in the distributor passage. The inflow calmers 302 are arranged directly beneath the liquid outflow openings 216 of the side passage 210.

Figure 6:
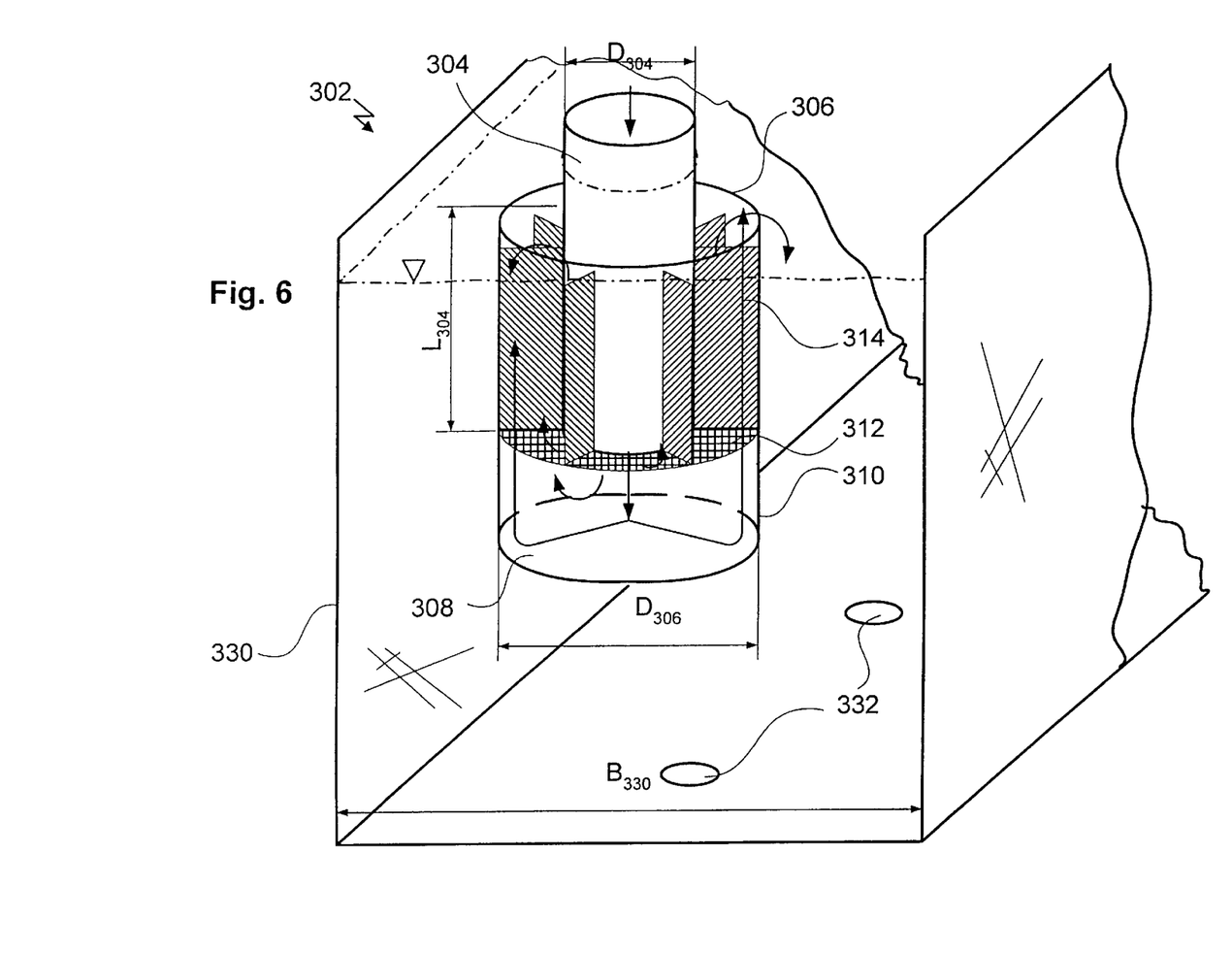
FIG. 6 is an exemplary embodiment for an inflow calmer in an enlarged view.

FIG. 6 shows in detail an exemplary embodiment for an inflow calmer 302. It consists of a thin-walled immersion tube 304 with preferably circular cross-section, the inner diameter of which is greater than the liquid outflow opening of the side passage which is located above it. The immersion tube 304 protrudes for example by 50 to 90% of its length $L_{304}$ into a thin walled pot 306. The diameter $D_{306}$ of the pot 306 is greater than the diameter of the immersion tube 304 by a factor of at least $\sqrt{2}$, preferably not greater than half the passage width $B_{330}$. The pot 306 is open upwardly; its base 308 is closed; its jacket surface 310 is designed to be completely closed or perforated only in the upper edge region. A sieve grid 312 and/or a guide blade grid 314 can be arranged between immersion tube 304 and pot 306. The liquid enters into the immersion tube 304 and from there into the pot 306. The base 308 forces the downwardly flowing liquid to reverse its direction. Through the sieve grid 312 large turbulences are divided up into small ones, which decay more rapidly. The liquid flow which is directed upwards is then nearly similar to a well flow which is relatively weak and uniform. A guide blade grid 314 is helpful for the uniform orientation of the liquid flow. The liquid then flows shallowly over the edge of the pot 306 into the distributor passage 330.

Figure 7:
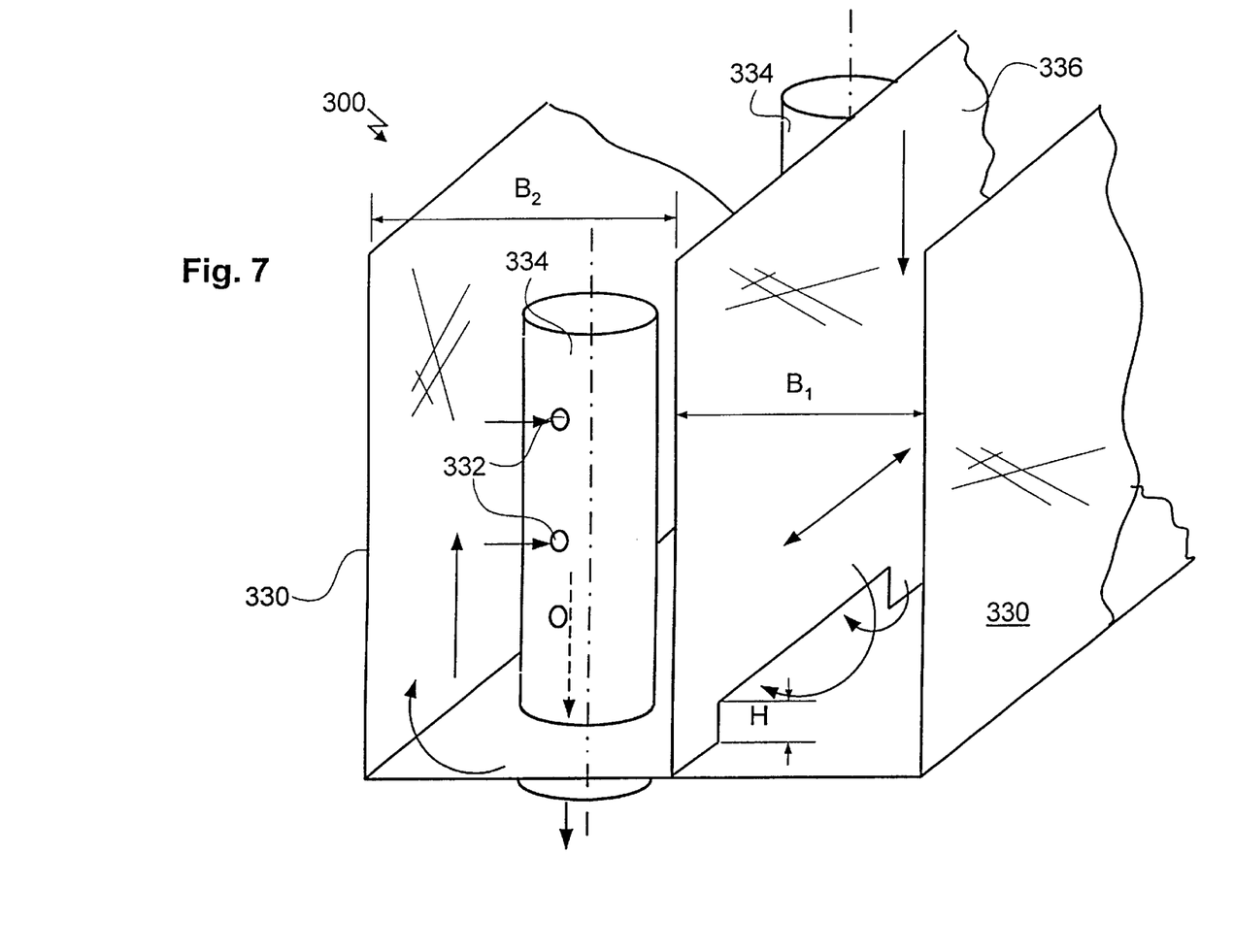
FIG. 7 is an exemplary embodiment for a distributor outflow system.

FIG. 7 shows a section of an exemplary embodiment for a distributor outflow system 300. Illustrated is a thin-walled distributor passage 330 with inwardly lying tubes 334 and a vertically arranged protector 336, which serves as a flow splitter and divides up the distributor passage 330 into quasi two chambers. The liquid enters from the side passage or inflow calmer into the first chamber with the width $B_1$. The latter is formed by the weir 336 and for example the right side wall of the distributor passage 330. In this region the liquid can distribute itself uniformly horizontally and then flows through a hydraulically definite opening with the height H into the second chamber with the width $B_2$ to the tubes 334. The tubes 334 have liquid outflow openings 332 through which the liquid flows off to the packing bed lying below them.

What is claimed is:

1. Apparatus for the collection and distribution of liquid in a column comprising a plurality of unordered or ordered packings located on a carrier grid, the apparatus comprising at least one lamella collector and a distributor outflow system which is arranged below the carrier grid with a side passage being contained in each lamella collector and liquid outflow openings being arranged in a combination, as a result of which a hydrodynamic equalization for a liquid to be distributed results, thus causing the liquid to be homogenously distributed over the column cross-section.

2. The apparatus in accordance with claim 1, wherein in the at least one lamella collector a flow splitter separates a main passage from the side passage; and in that the liquid outflow openings are partly introduced into the flow splitter.

3. The apparatus in accordance with claim 2, wherein the at least one lamella collector together with the main passage and the side passage as well as the flow splitter forms a unit comprising surface elements which are arranged angularly to one another.

4. The apparatus in accordance with claim 2, wherein the flow splitter is designed in such a manner that a liquid entry into the side passage takes place out of the main passage from above or from below through the liquid outflow openings.

5. The apparatus in accordance with claim 1, wherein a plurality of lamella collectors arranged parallel to one another cover over an entire cross-sectional area of a material exchange column.

6. The apparatus in accordance with claim 1, wherein a plurality of main passages of the at least one lamella collector are connected to one another by a ring passage of a collector.

7. The apparatus in accordance with claim 1, wherein the liquid outlet out of the side passage into the distributor outflow system takes place via an inflow calmer.

8. The apparatus in accordance with claim 1, wherein the liquid outlet out of the side passage opens into a chamber of the distributor outflow system which is located between a side wall of the distributor outflow system and a weir.

9. Apparatus for the collection and distribution of liquid in a column, comprising at least one lamella collector and a distributor outflow system which is arranged below it, with a side passage being contained in each lamella collector and liquid outflow openings being arranged in a combination, as a result of which a hydrodynamic equalization for a liquid to be distributed results;

wherein the liquid outlet out of the side passage into the distributor outflow system takes place via an inflow calmer; and wherein the inflow calmer is built up of an immersion tube which is arranged centrally in a pot, with a cross-section of the immersion tube being larger than the liquid outlet opening of the side passage lying above it.

10. Apparatus in accordance with claim 7, wherein an immersion tube protrudes by 50 to 90% of its length into a thin walled pot.

11. Apparatus in accordance with claim 9, wherein a cross-sectional area of the pot is at least twice as large as the cross-sectional area of the immersion tube.

12. Apparatus in accordance with claim 9, wherein with a circular cross-section of the immersion tube and the pot, the diameter of the pot is greater than the diameter of the immersion tube by a factor of at least $\sqrt{2}$.

13. The apparatus in accordance with claim 9, wherein the pot has a base below and is open upwardly.

14. The apparatus in accordance with claim 9, wherein a sieve grid is arranged over the entire cross-sectional area of the pot or only between the immersion tube and the pot.

15. The apparatus in accordance with claim 9, wherein a guide blade grid is arranged at least between the overlapping of the pot and the immersion tube.

16. The apparatus in accordance with claim 12, wherein the diameter of the pot is not greater than half a passage width.

* * * * *